Sept. 5, 1961 R. F. WINTER 2,998,785
DOUGH ROLLER
Filed Aug. 6, 1959 4 Sheets-Sheet 1

FIG. I.

INVENTOR.
Robert F. Winter

Sept. 5, 1961 R. F. WINTER 2,998,785
DOUGH ROLLER

Filed Aug. 6, 1959 4 Sheets-Sheet 2

INVENTOR.
Robert F. Winter

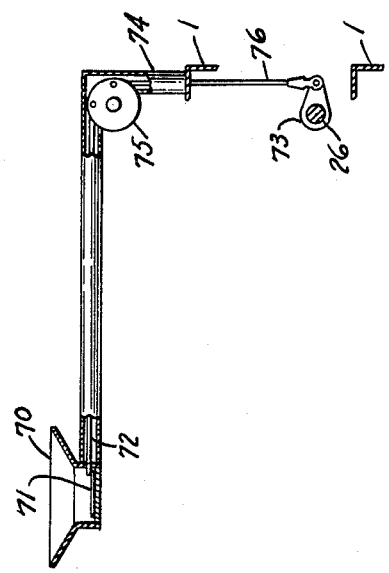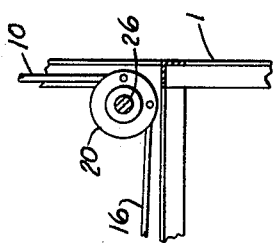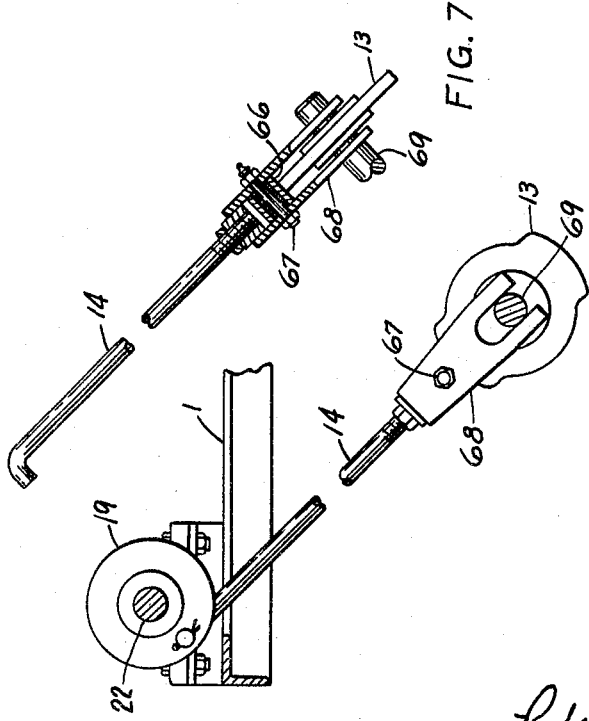

United States Patent Office 2,998,785
Patented Sept. 5, 1961

2,998,785
DOUGH ROLLER
Robert F. Winter, 7221 N. Peoria Ave.,
Tulsa County, Okla.
Filed Aug. 6, 1959, Ser. No. 832,094
6 Claims. (Cl. 107—12)

My invention relates to a machine for rolling live dough to a measured thickness.

In general, the invention consists of a circular table that is raised or lowered while being rotated clockwise or counter-clockwise, this table working in conjunction with a reciprocating roller serving to roll or flatten the dough to a predetermined thickness.

Specifically, the invention utilizes a cylindrical roller operating against a flat surface of the circular table upon which a dough-batch has been placed. As the roller reciprocates, the table is turned and also raised upwardly toward the roller until the proper thickness of the rolled dough sheet is attained as determined by a pre-set switch which stops the roller and again lowers the table to the starting position.

The construction and arrangement of parts are hereinafter described and illustrated with reference to the accompanying drawings, wherein:

FIG. 4 is an enlarged detail view of the cam assembly which raises and lowers the cylindrical roller;

FIG. 5 is a detail view partly in section of the flour duster;

FIG. 6 is an enlarged partial section view taken along line 6—6 of FIG. 3; and

FIG. 7 is a further detail view of the cam assembly, partly in section.

Figure 1:
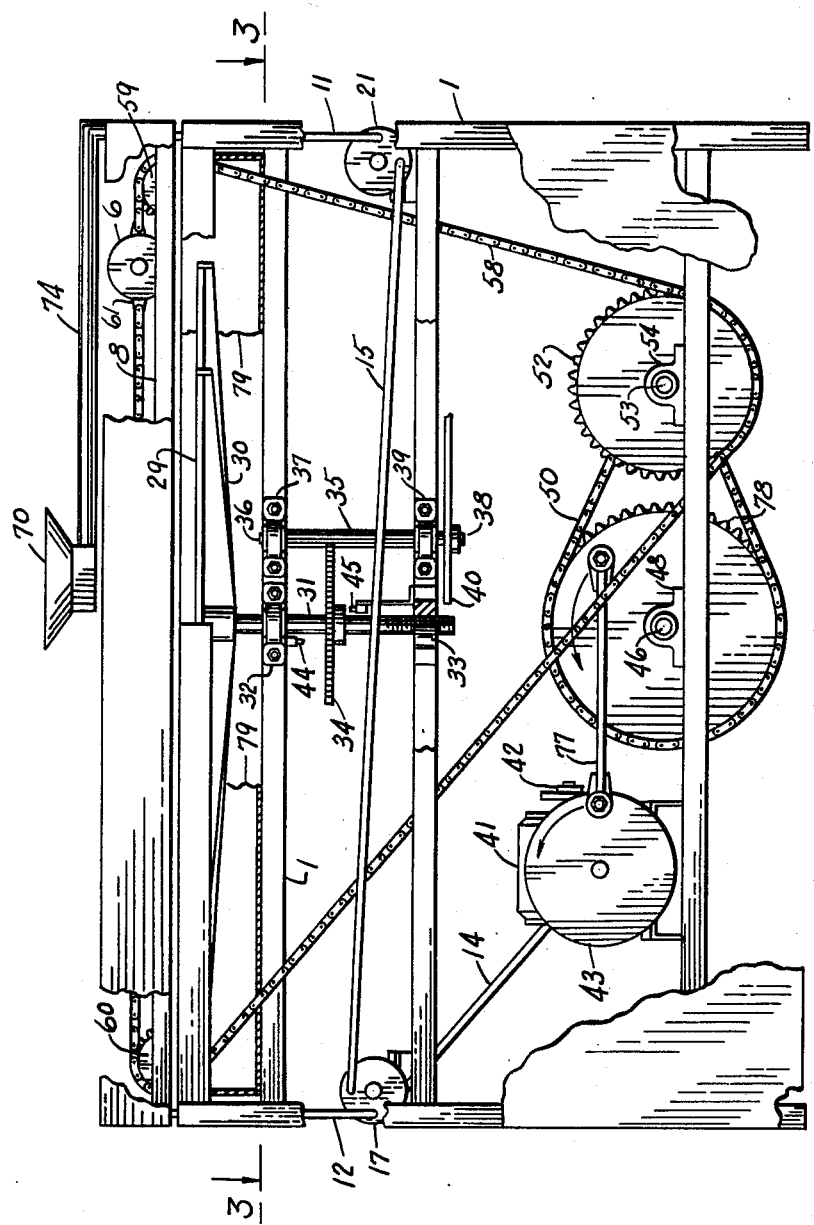
FIG. 1 is an elevation view of the machine with portions of the side panels broken away to show the internal mechanisms.
Figure 2:
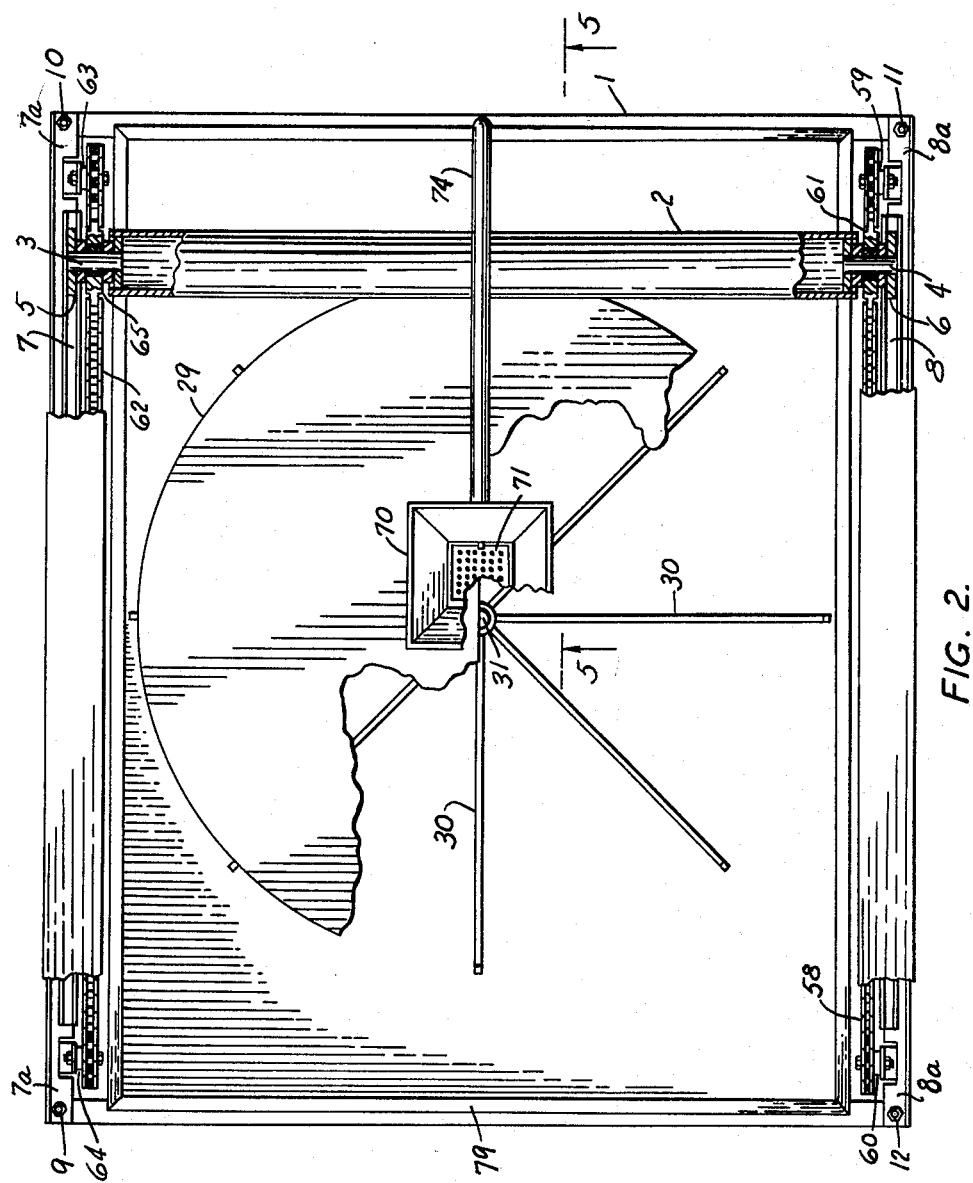
FIG. 2 is a top plan view of the machine, partly in section.
Figure 3:
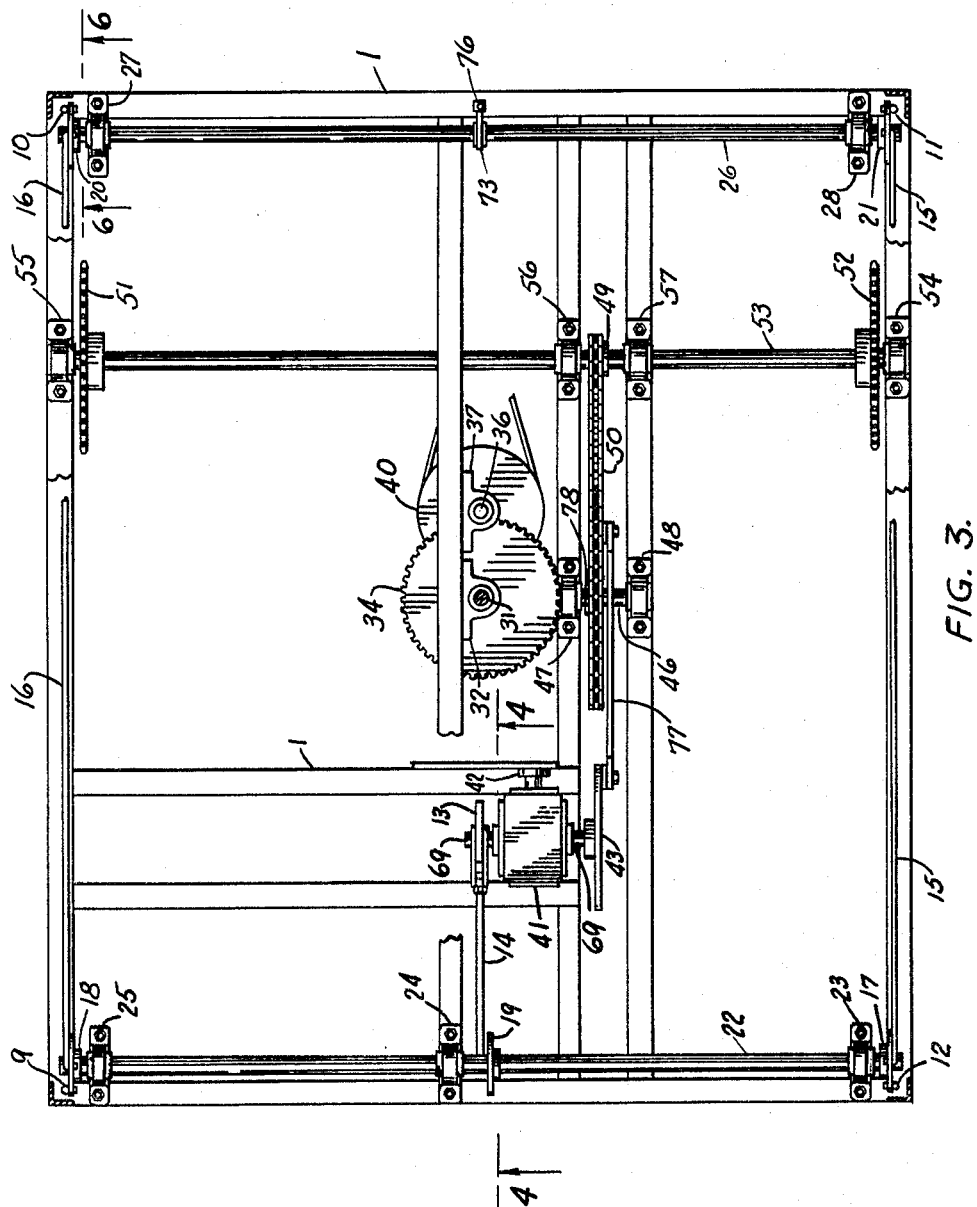
FIG. 3 is a sectional view along line 3—3 of FIG. 1 showing the drive train.

Referring particularly to the drawings, the reference numeral 1, which is shown on FIGS. 1, 2 and 3, generally indicates a frame of sufficient strength and rigidity to support all working parts and appurtenances, and the frame supporting near its top a cylindrical roller 2 equipped with shafts 3 and 4 extending from each end on which are rigidly mounted wheels 5 and 6, the diameters of which are identical to the diameter of the cylindrical roller 2. The wheels 5 and 6 function as carriers for the cylindrical roller 2 by rolling in grooved tracks 7 and 8 which are supported near the top of the frame on perpendicular rods 9, 10, 11 and 12, respectively anchored to the ends of guide members 7a and 8a which support tracks 7 and 8 as shown. Such rods serve to raise and lower these members and thereby the cylindrical roller 2 as it reciprocates, thus serving the specific purposes of lowering the cylindrical roller 2 as it travels from the center to the outer extremity of the circular table 29 and of raising the cylindrical roller 2 as it travels in returning from the outer extremity to a position above the center of table 29. The motion of the rods is initiated by a cam 13 and transferred through the rods 14, 15, 16, which rotate eccentric cam wheels 17, 18, 19 fixed on a shaft 22 which is journaled in bearings 23, 24 and 25. Additional cam wheels 20 and 21 are fixed on the shaft 26 which is supported by bearings 27 and 28. The forementioned rods 9, 10, 11 and 12 are connected respectively to cams 18, 20, 21 and 17 by which they are supported and vertically reciprocated.

The table 29 consists of a removable board that is supported by a plurality of arms 30 attached rigidly to the upper end of a vertically mounted shaft 31 and extending outwardly at right angles therefrom, and each arm having on its outer end an abutment which together define a recessed circular area into which said table 29, which is circular and of rigid material, can rest to form a smooth flat rolling surface. Shaft 31 is supported by bearings 32 and 33 which are mounted rigidly on cross members of the frame 1. The bearing 33 and the lower portion of the shaft 31 are threaded and mutually engaged and properly meshed so that by rotating the shaft 31 in a counter-clockwise direction the table 29 is raised, and by rotating the shaft 31 in a clockwise direction the table 29 is lowered. A gear 34 is fixed on the shaft 31 and is used to rotate the latter when driven by a pinion rod 35, which has teeth of the same pitch as the gear 34, said teeth extending the full length of the pinion rod so that when the gear 34 rises or descends with the shaft 31 and the table 29, the teeth of the pinion rod 35 and the gear 34 remain properly meshed. The pinion rod 35 is equipped with shafts extending from each end, the upper shaft 36 extending into and being supported by a bearing 37 and the lower shaft 38 extending through and being supported by a bearing 39. A source of power (not shown) drives the pinion rod 35 through a pulley 40. Reversible directional rotation of pinion rod 35 and gear 34 is accomplished by the use of a switch 44 whose dual function is to reverse the drive to the pinion rod and stop the drive to the cylindrical roller 2 when it reaches a predetermined proximity to the table, whereupon the table 29 can be lifted from the machine after the rolling cycle has been completed. The switch 44 is located above the gear 34 and near the shaft 31, and is actuated by the gear 34 when it has been raised to a sufficient height to engage said switch.

A switch 45 located below the gear 34 and adjacent to the shaft 31 serves to reverse the drive to the table in a like manner when gear 34 has been lowered sufficiently to actuate said switch.

The mechanism for operation of the cylindrical roller 2 includes a speed reducer 41 which is mounted rigidly on a cross member of frame 1 and is driven by a source of power (not shown) through a pulley 42. The speed reducer 41 has a double ended output shaft 69, the shaft on one side operating the cam 13 which is rigidly mounted thereon, see FIGS. 3, 4 and 7, and the end of the shaft on the opposite side of the reducer operating cam wheel 43 which is mounted thereon. Cam wheel 43 rotates a sprocket 78 forward and backward by reciprocating an arm 77. The sprocket 78 is mounted rigidly on a shaft 46 which is journaled in bearings 47 and 48 which are mounted rigidly on cross members of the frame 1. The sprocket 78 is coupled to drive a sprocket 49 by a roller chain 50, which sprocket 49 is of smaller diameter than the sprocket 78. Therefore the rotational motion is multiplied by the sprocket 52 sufficiently to give the cylindrical roller 2 a proper amount of reciprocating travel. The sprockets 49, 51, and 52 are fixed on a shaft 53 which is carried by bearings 54, 55, 56, 57 which are rigidly mounted on cross members of the frame 1 as shown in FIG. 3. The sprocket 52 drives a roller chain 58 which is guided by idler sprockets 59 and 60 rotatably supported on top of the frame 1. The ends of the roller chain 58 are fastened to shackles 61 which are supported loosely in the manner of a bearing on the shaft 4 between the wheel 6 and the end of the cylindrical roller 2. The sprocket 51 drives a roller chain 62 around idler sprockets 63 and 64, the ends of the chain 62 being shackled at 65 to the shaft 3 in a like manner.

With rotation of the previously mentioned cam 13, the cylindrical roller 2 is made to reciprocate vertically. This cam 13 is mounted on the double shaft 69 of the speed reducer 41, opposite the cam 43, and therefore rotates therewith. The cam 13 has lobes of proper size and spacing to reciprocate the rod 14 to raise and lower the cylindrical roller 2 as previously described. This is accomplished by having the lobes of cam 13 work against a roller 66, FIG. 7, carried by stud 67 which is anchored rigidly in a yoke 68 which permits the rod 14 to oscillate the cam wheel 19. This can best be seen in FIGS. 4 and 7. The yoke 68 consists of two forks with slots of sufficient width to admit the shaft 69, said forks being located on each side of the cam 13 opposite each other and joined rigidly together at their upper ends, but spaced with sufficient clearance for the cam 13 to rotate freely.

In order to prevent the dough from sticking to the roller or the table, a flour duster or dropper has been provided which consists of a receptacle 70 having a perforated bottom. On the perforated bottom lies a perforated plate 71 movable in one direction and reciprocated by an arm 73 fixed to the shaft 26, and connected to the plate 71 by a rod 72, a cam wheel 75, and another rod 76. The receptacle 70 is mounted rigidly above the cylindrical roller 2, and centrally located between the sides of the frame 1 by a support 74 conveniently made of pipe or tubing, within which the rod 72, the cam 75, and the rod 76 are enclosed.

The pan 19 is used for catching and holding excess flour and is located in the upper part of the frame 1 below the table 29 and the roller 2, the pan resting on cross members of the frame 1 which are anchored to the upright sides of the frame 1. The shaft 31 extends upwardly through an opening in the center of the pan 79.

I claim:

1. An automatic rolling machine comprising a frame; coacting rolling elements including a rotary table supported by said frame and a roller disposed adjacent said table; guide means supporting said roller to roll about its own axis in planes parallel to said table; support means for movably mounting said guide means in the frame to select its position with respect to the table; roller drive means in the frame and coupled to the roller for cyclically translating said roller from a first position over the center of rotation of the table to a second position over the periphery thereof and then back to said first position; linkage means connected between said support means and said drive means for moving the guide means nearer the table while the roller is translating from the first to the second position and for moving the track means away from the table while the roller is returning to the first position; and means for adjusting the minimum spacing between said coacting rolling elements.

2. An automatic rolling machine comprising a frame; coacting rolling elements including a rotary table supported by said frame and a roller disposed adjacent said table; guide means supporting said roller to roll about its own axis adjacent and parallel to said table; support means for reciprocably mounting said guide means on the frame for reciprocation normal to the table; roller drive means in the frame and coupled to the roller for cyclically translating said roller along the guide means from a first position over the center of rotation of the table to a second position over the periphery thereof and then back to said first position; linkage means connected between said support means and said drive means for moving the guide means nearer the table while the roller is translating from the first to the second position and for moving the track means away from the table while the roller is returning to the first position; and means for adjusting the minimum spacing between said coacting rolling elements.

3. An automatic rolling machine comprising a frame; coacting rolling elements including a rotary table having a shaft supported by said frame and a roller disposed adjacent said table; guide means supporting said roller to roll about its own axis adjacent and parallel to said table; support means for reciprocably mounting said guide means on the frame for reciprocation normal to the table; roller drive means in the frame and coupled to the roller for cyclically translating said roller along the guide means from a first position over the center of rotation of the table to a second position over the periphery thereof and then back to said first position; linkage means connected between said support means and said drive means for moving the guide means nearer the table while the roller is translating from the first to the second position and for moving the track means away from the table while the roller is returning to the first position; and means for slowly advancing the table toward the roller.

4. In a machine as set forth in claim 3, said table shaft being threaded and engaging a threaded bore in the frame; and table drive means coupled to the shaft for rotating the latter.

5. An automatic rolling machine comprising a frame; a rotary table having a shaft supported by said frame; a roller disposed adjacent said table; track means supporting said roller to roll about its own axis adjacent and parallel to said table; track support means reciprocably mounted on the frame for reciprocation normal to the table; roller drive means in the frame and to the roller for cyclically translating said roller along the track means from a first position over the center of rotation of the table to a second position over the periphery thereof and then back to said first position; a cam rotated by said drive means; linkage means connected between said track support means and said cam for moving the track means nearer the table while the roller is translating from the first to the second position and for moving the track means away from the table while the roller is returning to the first position; and means for slowly advancing the table toward the track means.

6. In a machine as set forth in claim 5, said table shaft being threaded and engaging a threaded bore in the frame; table drive means coupled to the shaft for rotating the latter; and limit switch means on the frame and responsive to the position of the table axially of its shaft for de-energizing the drive means.

References Cited in the file of this patent

UNITED STATES PATENTS

| 728,799 | Jones | May 19, 1903 |
| 1,878,352 | Ward et al. | Sept. 20, 1932 |

FOREIGN PATENTS

| 43,055 | Norway | Aug. 23, 1926 |
| 293,966 | Great Britain | July 19, 1928 |